Jan. 8, 1952 L. A. COOPER 2,581,753
COMBINED TRUCK AND IMPLEMENT CARRIER
Filed April 28, 1950 4 Sheets-Sheet 4
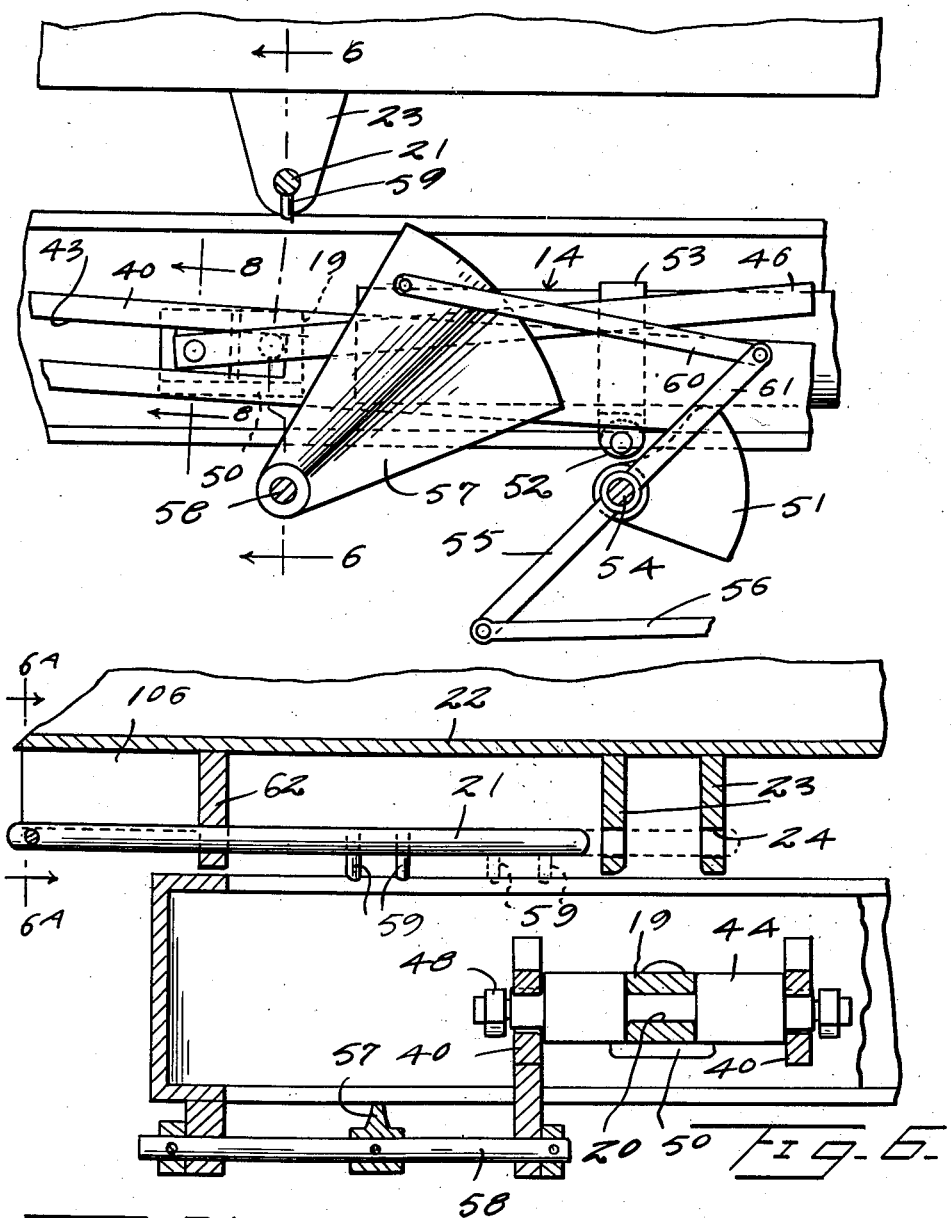
INVENTOR
Lee A. Cooper
BY
ATTORNEYS Patented Jan. 8, 1952

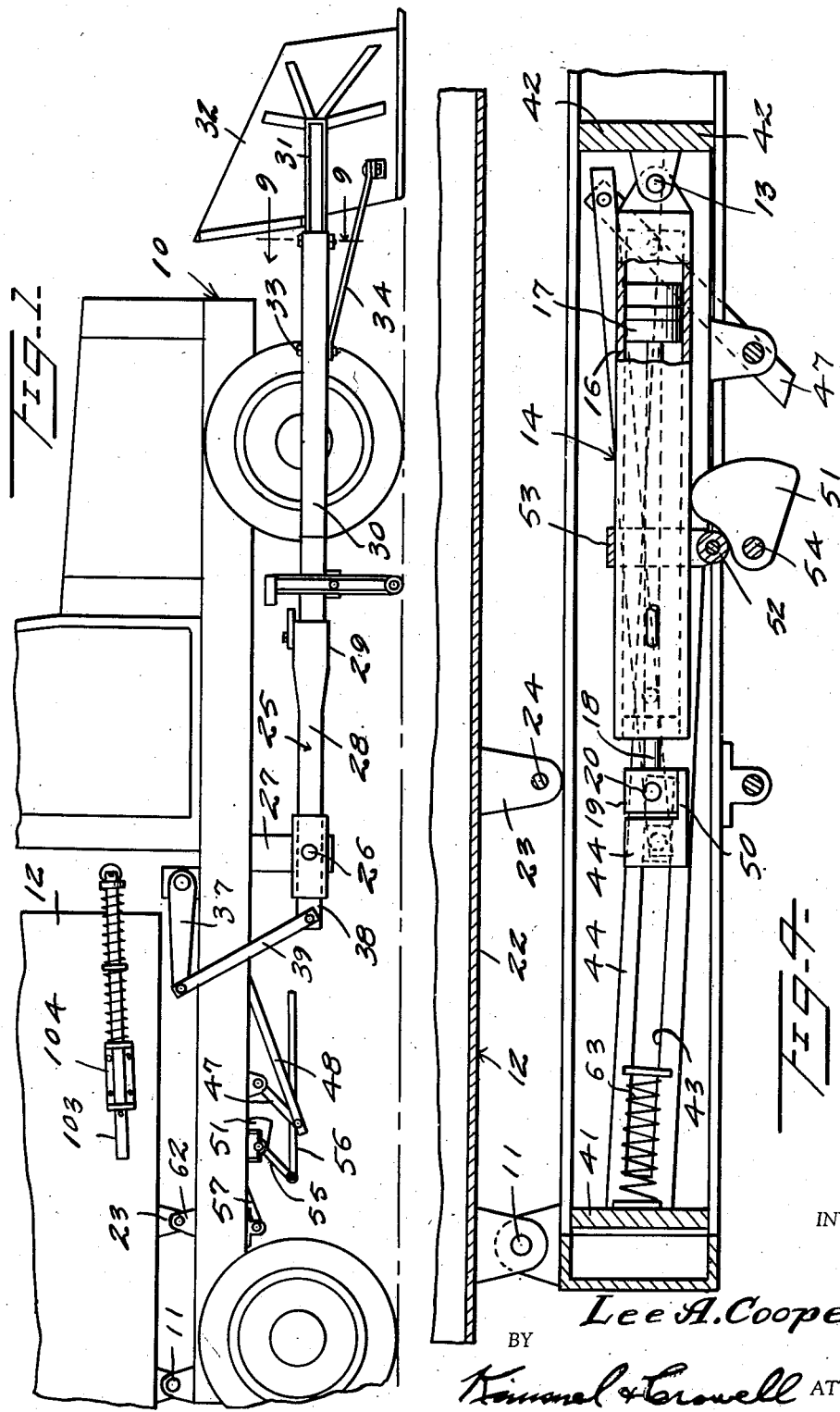

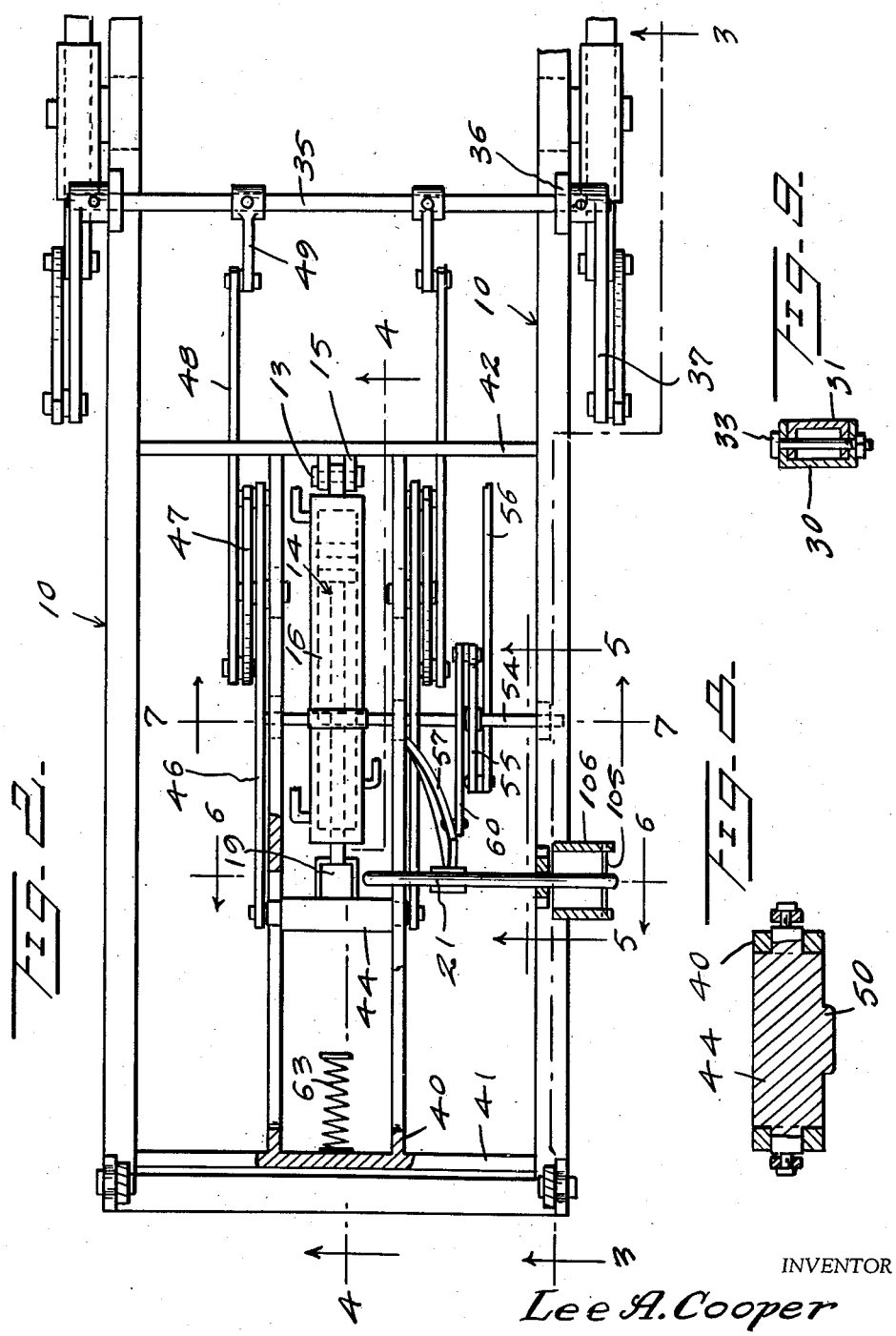

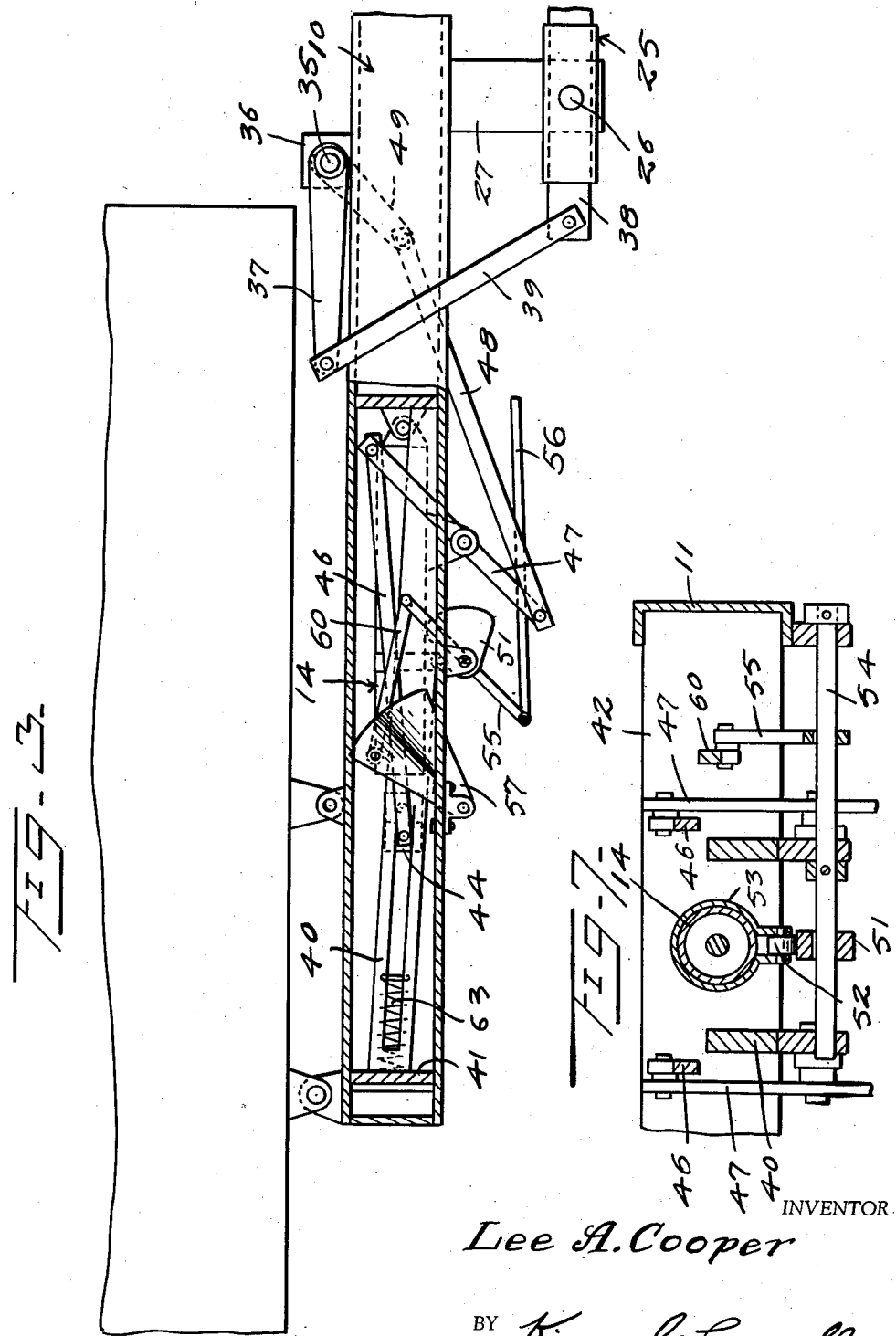

2,581,753

UNITED STATES PATENT OFFICE 2,581,753

COMBINED TRUCK AND IMPLEMENT CARRIER

Lee A. Cooper, Ojus, Fla.

Application April 28, 1950, Serial No. 158,712

2 Claims. (Cl. 214—78)

This invention relates to a combined truck and implement operator.

An object of this invention is to provide in combination with a truck having a pivoted dump body and a pair of forwardly extending pivoted implement carrying levers, a single hydraulic operator for the body and the levers, and manually operated means for coupling either the body or the levers to the operator.

A further object of this invention is to provide an improved means operable from the cab of a truck whereby the truck body may be tilted or implement carrying levers may be operated from a single operator.

With the above and other objects in view, my invention consists in the arrangement, combination and details of construction disclosed in the drawings and specification, and then more particularly pointed out in the appended claims.

In the drawings:

Figure 1 is a fragmentary side elevation of a truck constructed according to an embodiment of this invention.

Figure 2 is a fragmentary horizontal section showing the chassis with the hydraulic operator and connections to the truck body and implement carrying levers.

Figure 3 is a fragmentary sectional view taken on the line 3—3 of Figure 2.

Figure 4 is a fragmentary sectional view taken on the line 4—4 of Figure 2.

Figure 5 is a fragmentary sectional view taken on the line 5—5 of Figure 2.

Figure 6 is a fragmentary sectional view taken on the line 6—6 of Figures 2 and 5.

Figure 6-A is a fragmentary sectional view taken on the line 6-A—6-A of Figure 6

Figure 7 is a fragmentary sectional view taken on the line 7—7 of Figure 2.

Figure 8 is a sectional view taken on the line 8—8 of Figure 5.

Figure 9 is a sectional view taken on the line 9—9 of Figure 1.

Referring to the drawings, the numeral 10 designates generally a chassis of a truck or motor vehicle which has pivotally mounted on the rear thereof as indicated at 11 a dump body 12. A hydraulic operator generally designated as 14 is swingably mounted on a pivot 13 extending through a pair of bearing members 15 which are fixed relative to the chassis 10. The hydraulic operator 14 is adapted to be connected to a source of fluid pressure and includes a cylinder 16 having a piston 17 (see Fig. 4) slidable therein.

The piston 17 has a piston rod 18 secured thereto and extending through the rear head of the cylinder 16. The piston rod 18 has secured thereto a ram head 19 which is formed with an opening 20 within which a coupling pin 21 is adapted to engage. Pin 21 is longitudinally slidable in a guide 62 fixed to bottom 22 of the truck body, and pin 21 is held against turning by a cross-pin 105 which slidably engages beneath a pair of guides 106 which are fixed to bottom 22. The body 12 has extending downwardly from the bottom 22 thereof a pair of ears or guides 23 formed with aligned openings 24 within which the coupling pin 21 is adapted to engage when the head 21 is coupled to the body 12.

A pair of implement carrying arms 25 are pivotally mounted on pivots 26 carried by depending supports 27 which extend downwardly from the chassis 10. The arms 25 include a rear arm 28 formed with a socket 29 within which a forward arm 30 is detachably engaged. The forward arm 30 is adapted to have secured thereto the side bars 31 of an implement 32. In the present instance the implement is shown as a bucket or scoop having the side bars 31 secured thereto, and the side bars 31, which are of channel shape, telescope the channel shape arms 30 and are secured thereto by fastening means 33.

The implement 32 is braced by means of bracing members 34 (see Fig. 1) connected between the implement 32 and the arms 30. A transversely disposed shaft 35 is journalled in bearings 36 carried by the chassis 10 and has fixed thereto at the opposite ends thereof lever arms 37. The arms 37 are connected to the rear arm extensions 38 of arms 28 by means of links 39.

The chassis has disposed between the sides thereof a pair of elongated spaced apart parallel bars 40 which are fixed between transverse bars 41 and 42. The bars 40 constitute guides being formed with an elongated guide slot 43 within which a slide 44 slidably engages. The slide 44 has connected to the opposite ends thereof a pair of links 46 which extend forwardly and are pivotally connected to rock levers 47. The rock levers 47 are connected by links 48 to lever arms 49 fixed on the shaft 35 between the bearings 36.

The slide 44 includes a forwardly projecting plate 50 which is adapted to be engaged by the ram head 19 when the latter is uncoupled from the truck body so as to hold the ram head 19 in operative position with respect to the slide 44.

The hydraulic operator 14 is adapted to be vertically rocked so as to selectively dispose this operator in either a position for coupling to the truck body or in a lower position engaging the plate 50 and bearing against the slide 44 by means of a cam member 51 which engages a roller 52 carried by a band 53 which is clamped about the operator 14.

The cam 51 is fixed on a transversely disposed shaft 54 (see Fig. 7) which is journalled between the guide bars 40, and the shaft 54 has secured thereto a lever 55 which is pivotally connected to an elongated operating bar 56 extended forwardly to a position for operation by a person in the cab of the truck.

When the cam 51 is turned counterclockwise as viewed in Figure 5 the operator 14 will be raised to a position where the ram head 19 will be disposed between the ears 23. At the time the operator 14 is initially raised to its uppermost position by the cam 51 a second spiral cam 57 carried by a shaft 58 which is journalled between the side bars 40 will be rocked counterclockwise. The spiral cam 57 will engage between a pair of guide pins 59 which project downwardly from the coupling pin 21 so that the coupling pin will be moved inwardly through the ears 23 and the opening 20 in the ram head 19.

The cam member 57 is connected by means of a link 60 (see Fig. 5) to a lever 61 which is fixed on the shaft 54 so that the two cams 51 and 57 will swing or rotate in unison. When the shaft 54 is turned clockwise so as to swing the cams 51 and 57 clockwise, coupling pin 21 will be moved laterally and disengaged from the ears 23, sliding in guide member 62 which is carried by the bottom 22. At the time the coupling pin 21 is disengaged from the ram head 19 which at this time is in a truck body tilting position, the cam 51 will permit operator 14 to gravitatingly swing downwardly so that the ram head 19 will rest on the plate 50 of slide 44. When pressure is discharged into cylinder 16, ram head 19 will move slide 44 rearwardly and thereby rock the implement carrying levers 25 upwardly to a position for discharging the material in the bucket or scoop 32 into the truck body 12.

When the slide 44 nears the end of its rearward movement the slide 44 will compress a spring 63 (see Figs. 2 and 4) which is carried by the transverse supporting bar 41 between the guide bars 40. The spring 63 is provided so that the implement carrying levers 25 will be spring pressed forwardly upon release of pressure in operator 14 to a point where the levers 25 will be off center and will then gravitatingly swing downwardly to an implement working position. A pair of spring-pressed bars 103 are carried by guides 104 fixed to the opposite sides of the truck body and are engageable with levers 25 when the latter are in dumping position. Bars 103 assist spring 63 in swinging the arms 25 forwardly after the bucket 32 has been emptied so that arms 25 will gravitatingly swing downwardly.

In the use and operation of this invention, any desired earth working implement such as a scoop or the like may be coupled to the implement carrying arms 25. Where the implement is a scoop or bucket and it is desired to pick up the dirt, the arms 25 are rocked downwardly at their rear ends so as to raise the implement 32. The rocking of the arms 25 is accomplished by disposing the ram head 19 on the supporting plate 50 of slide 44.

Assuming that the body 12 is filled with material picked up by the scoop 32 and it is desired to move this material to another location the truck may be moved by raising the implement carrying arms 25 a slight degree and then locking the arms 25 in their upraised position through the hydraulic operator. When the truck is in the desired location, the arms 25 may be lowered and at this time the ram head 19 will be disposed below the ears 23 carried by the body 12. The counterclockwise rotation of shaft 54 through the bar 56 and the lever 55 will cause cam 51 to raise operator 14 to its uppermost position.

At the time the operator 14 is in its uppermost position, ram head 19 will be disposed between the ears 23 with the opening 20 aligning with the openings 24 of ears 23. Further counterclockwise rotation of shaft 54 will cause cam 57, which engages between the guide pins 59, to move coupling pin 21 inwardly or to the right as viewed in Figure 6.

With coupling pin 21 disposed in body coupling position with respect to the operator 14 fluid pressure may be forced into cylinder 16 so as to cause body 12 to swing upwardly at its forward end and thereby dump the material from the rear of the chassis 10.

With a combination as hereinbefore described a single operator of hydraulic characteristic can be used for operating implements at the forward end of the truck and the operator may be selectively coupled to the implement carrying arms or levers or to the truck body so as to tilt the truck body to a dumping position.

What is claimed is:

1. In combination, a truck having a chassis, a body pivoted on said chassis, a pair of implement carrying arms pivotally carried by said chassis and extending lengthwise, a hydraulic member pivotally secured at one end relative to said chassis, a longitudinally movable slide carried by said chassis, means connecting said slide with said arms for rocking the latter with movement of said slide, coupling means for coupling said hydraulic member with either said body for tilting said body or for coupling said hydraulic member with said slide for moving the latter lengthwise of said chassis to thereby rock said arms, said coupling means including a pin, a pair of ears fixed to said body and having openings aligning with said pin when said body is in a lowered horizontal position, means for moving said pin laterally into said openings, and means supporting said hydraulic member in a position to be coupled to said ears when said pin is moved into said openings.

2. In combination, a truck having a chassis, a body pivoted on said chassis, a pair of implement carrying arms pivotally carried by said chassis and extending lengthwise, a hydraulic member pivotally secured at one end relative to said chassis, a longitudinally movable slide carried by said chassis, means connecting said slide with said arms for rocking the latter with movement of said slide, coupling means for coupling said hydraulic member with either said body for tilting said body or for coupling said hydraulic member with said slide for moving the latter lengthwise of said chassis to thereby rock said arms, said coupling means including a pin, a pair of ears fixed to said body and having openings aligning with said pin when said body is in a lowered horizontal position, means for moving said pin laterally into said openings, means supporting said hydraulic member in a position to be coupled to said ears when said pin is moved into said openings, and means active when said pin has become disengaged from said ears for lowering said hydraulic member to a position engaging said slide.

LEE A. COOPER.

REFERENCES CITED

The following references are of record in the file of this patent:

UNITED STATES PATENTS

| Number | Name | Date |
|---|---|---|
| 1,880,627 | Wilson | Oct. 4, 1932 |
| 2,170,932 | Venema | Aug. 29, 1939 |
| 2,233,521 | Ernst et al. | Mar. 4, 1941 |
| 2,338,361 | Shinn, Jr. | Jan. 4, 1944 |
| 2,398,119 | Sauder | Apr. 9, 1946 |
| 2,498,144 | Thomas | Feb. 21, 1950 |
| 2,525,384 | Troutman | Oct. 10, 1950 |
| 2,543,496 | Holopainen | Feb. 27, 1951 |